United States Patent
Lee et al.

(10) Patent No.: US 10,431,829 B2
(45) Date of Patent: Oct. 1, 2019

(54) ANODE ACTIVE MATERIAL FOR SECONDARY BATTERY, AND ANODE, ELECTRODE ASSEMBLY AND SECONDARY BATTERY COMPRISING THE SAME

(71) Applicant: LG Chem, Ltd., Seoul (KR)

(72) Inventors: Su Min Lee, Daejeon (KR); Sun Young Shin, Daejeon (KR); Su Yeon Lee, Daejeon (KR); Eun Kyung Kim, Daejeon (KR)

(73) Assignee: LG Chem, Ltd. (KR)

( * ) Notice: Subject to any disclaimer, the term of this patent is extended or adjusted under 35 U.S.C. 154(b) by 85 days.

(21) Appl. No.: 15/303,983

(22) PCT Filed: Oct. 14, 2015

(86) PCT No.: PCT/KR2015/010814
§ 371 (c)(1),
(2) Date: Oct. 13, 2016

(87) PCT Pub. No.: WO2016/153136
PCT Pub. Date: Sep. 29, 2016

(65) Prior Publication Data
US 2017/0040616 A1    Feb. 9, 2017

(30) Foreign Application Priority Data

Mar. 23, 2015 (KR) .................. 10-2015-0040019

(51) Int. Cl.
*H01M 4/13* (2010.01)
*H01M 4/62* (2006.01)
(Continued)

(52) U.S. Cl.
CPC ......... *H01M 4/628* (2013.01); *H01M 4/0402* (2013.01); *H01M 4/133* (2013.01);
(Continued)

(58) Field of Classification Search
CPC .... H01M 4/628; H01M 4/0402; H01M 4/133; H01M 4/1393; H01M 4/587;
(Continued)

(56) References Cited

U.S. PATENT DOCUMENTS

2002/0141934 A1* 10/2002 Gogotsi ................ B82Y 40/00
                                                          423/448
2006/0063005 A1* 3/2006 Gardner ................ B82Y 30/00
                                                          428/408
(Continued)

FOREIGN PATENT DOCUMENTS

JP    2002208402 A    7/2002
JP    2013030355 A    2/2013
(Continued)

OTHER PUBLICATIONS

International Search Report from PCT/KR2015/010814, dated Feb. 18, 2016.
(Continued)

*Primary Examiner* — Raymond Alejandro
(74) *Attorney, Agent, or Firm* — Lerner, David, Littenberg, Krumholz & Mentlik, LLP

(57) ABSTRACT

The present invention relates to a negative electrode active material for secondary batteries, and a negative electrode, an electrode assembly and a secondary battery including the same. The negative electrode active material includes polyhedral crystalline carbon, a first surface treatment layer disposed on a surface of the crystalline carbon and including amorphous carbon or oxidized crystalline carbon, and a second surface treatment layer disposed on a surface of the first surface treatment layer and including a polyacrylic acid ester copolymer, thereby improving output characteristics of batteries based on increased mobility of electrons resulting from surface-to-surface contact between active materials, controlling reactivity with an electrolyte, and enhancing high-temperature storage performance of batteries.

14 Claims, 2 Drawing Sheets

(51) Int. Cl.
*H01M 4/587* (2010.01)
*H01M 4/133* (2010.01)
*H01M 4/04* (2006.01)
*H01M 4/1393* (2010.01)
*H01M 4/36* (2006.01)
*H01M 10/0525* (2010.01)

(52) U.S. Cl.
CPC ......... *H01M 4/1393* (2013.01); *H01M 4/587* (2013.01); *H01M 4/366* (2013.01); *H01M 10/0525* (2013.01)

(58) Field of Classification Search
CPC ...... H01M 4/622; H01M 4/625; H01M 4/366; H01M 10/052
See application file for complete search history.

(56) References Cited

U.S. PATENT DOCUMENTS

| | | | | |
|---|---|---|---|---|
| 2009/0258298 A1* | 10/2009 | Unneno | ............ | C04B 35/62839 429/231.8 |
| 2012/0328949 A1* | 12/2012 | Yamaguchi | ......... | H01M 2/1686 429/224 |
| 2014/0050980 A1 | 2/2014 | Kang et al. | | |
| 2014/0227588 A1 | 8/2014 | Kim et al. | | |
| 2015/0079467 A1 | 3/2015 | Ahn et al. | | |

FOREIGN PATENT DOCUMENTS

| | | | |
|---|---|---|---|
| KR | 20080034219 | A | 4/2008 |
| KR | 20130034182 | A | 4/2013 |
| KR | 20130107892 | A | 10/2013 |
| KR | 20130134240 | A | 12/2013 |
| KR | 20140099987 | A | 8/2014 |
| KR | 20140139355 | A | 12/2014 |
| KR | 20140140982 | A | 12/2014 |
| KR | 20150016191 | A | 2/2015 |

OTHER PUBLICATIONS

Y.P. Wu et al., "Modified Natural Graphite As Anode Material for Lithium Ion Batteries", Journal of Power Sources, vol. 111, Jun. 2002, pp. 329-334.

* cited by examiner

[Fig. 1]
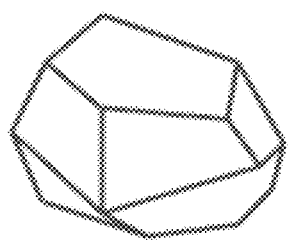

[Fig. 2]
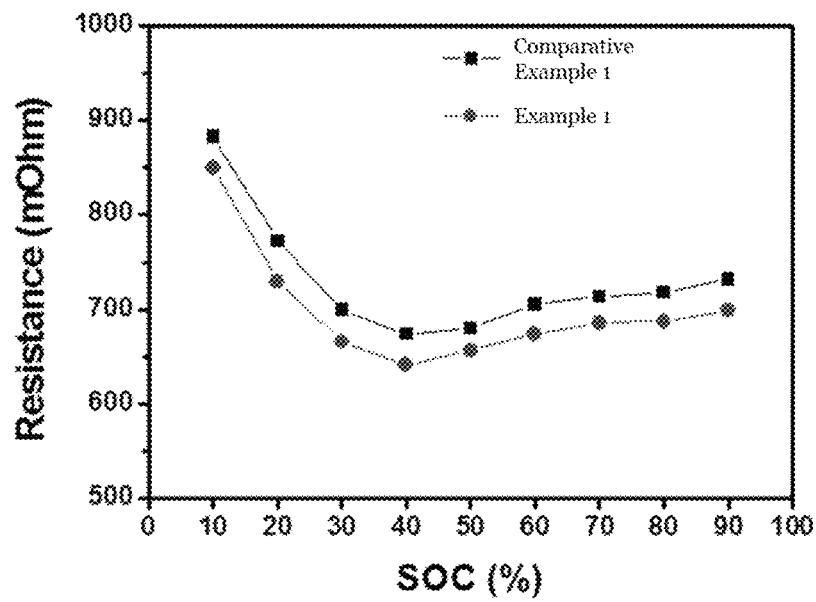
[Fig. 3]
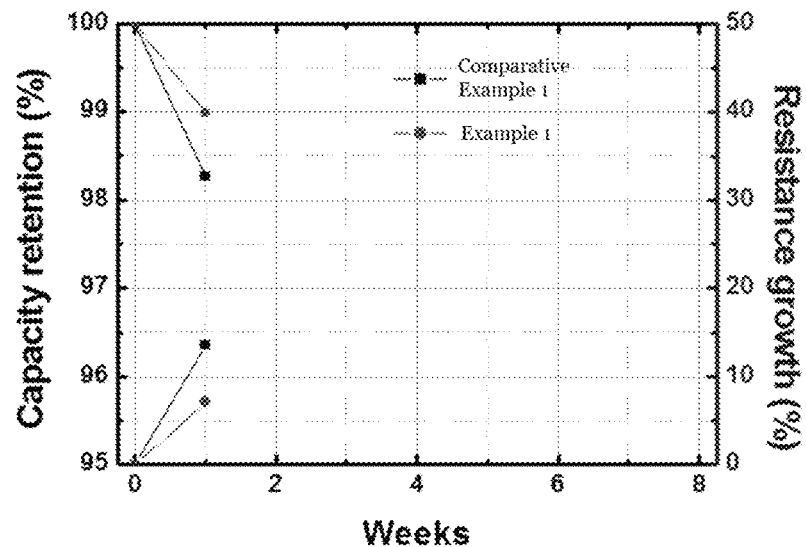

ANODE ACTIVE MATERIAL FOR SECONDARY BATTERY, AND ANODE, ELECTRODE ASSEMBLY AND SECONDARY BATTERY COMPRISING THE SAME

CROSS-REFERENCE TO RELATED APPLICATION

This application is a national phase entry under 35 U.S.C. § 371 of International Application No. PCT/KR2015/010814, filed Oct. 14, 2015, which claims priority to Korean Patent Application No. 10-2015-0040019, filed Mar. 23, 2015, the disclosures of which are incorporated herein by reference.

TECHNICAL FIELD

The present invention relates to a negative electrode active material for secondary batteries, and a negative electrode, an electrode assembly and a secondary battery including the same. More particularly, the present invention relates to a negative electrode active material for secondary batteries which can improve output characteristics of batteries based on increased mobility of electrons resulting from surface-to-surface contact between active materials, control reactivity with an electrolyte and enhance high-temperature storage performance of batteries, and a negative electrode, an electrode assembly and a secondary battery including the same.

BACKGROUND ART

Unlike primary batteries which are not chargeable, chargeable and dischargeable secondary batteries are actively researched for applications to high-tech fields including digital cameras, cell phones, notebooks and hybrid vehicles.

Secondary batteries may be classified into nickel-cadmium batteries, nickel-metal hydride batteries, nickel-hydrogen batteries, lithium secondary batteries and the like. Of these, lithium secondary batteries are generally used in portable electronic equipment or high-power hybrid vehicles due to high driving voltage and excellent energy density per unit weight, as compared to nickel-cadmium batteries and nickel-metal hydride batteries.

Meanwhile, generally, a lithium secondary battery includes: an electrode assembly including a positive electrode, a negative electrode and a separator; electrode taps extending from the electrode assembly; electrode leads welded to the electrode taps and the like.

In this case, the negative electrode is generally formed by coating a current collector with a carbon-based negative electrode active material. In this case, in the prior art, crystalline carbon such as natural graphite or artificial graphite having a high theoretical limit capacity was generally used as the negative electrode active material.

However, natural graphite, artificial graphite or the like increases the viscosity of a negative electrode active material slurry over time due to high water absorption capability and causes problems of difficulty in controlling a predetermined load and thus remarkable deterioration in processability when electrodes are produced using the same.

PRIOR ART DOCUMENT

Patent Document

1) Korean Patent Laid-open Publication No. 2007-0040853 (published on Apr. 17, 2007)

DISCLOSURE

Technical Problem

Therefore, it is an object of the present invention to provide a negative electrode active material for secondary batteries which can improve output characteristics of batteries based on increased electron movement caused by surface-to-surface contact between active materials, control reactivity with an electrolyte based on a surface-treatment layer having a double-layer structure and enhance high-temperature storage performance of batteries, and a method of producing the same.

It is another object of the present invention to provide a negative electrode for secondary batteries, an electrode assembly and a secondary battery including the negative electrode active material.

Technical Solution

In accordance with an aspect of the present invention, the above and other objects can be accomplished by the provision of a negative electrode active material for secondary batteries including polyhedral crystalline carbon, a first surface treatment layer disposed on a surface of the crystalline carbon and a second surface treatment layer disposed on a surface of the first surface treatment layer, wherein the first surface treatment layer includes amorphous carbon or oxidized crystalline carbon, and the second surface treatment layer includes a polyacrylic acid ester copolymer.

Regarding the negative electrode active material for secondary batteries, the crystalline carbon may include one or more of natural graphite and artificial graphite.

In addition, a coating layer of the amorphous carbon may include liquid or solid pitch.

In addition, the amorphous carbon may be present in an amount of 0.01 parts by weight to 15 parts by weight, with respect to 100 parts by weight of the crystalline carbon.

In addition, the oxidized crystalline carbon may include an oxygen functional group introduced between layers of a crystal structure of crystalline carbon. The oxygen functional group may include any one selected from the group consisting of $SO_3^{2-}$, $NO_3^-$, a carboxyl group, a hydroxyl group and a combination thereof.

In addition, the oxidized crystalline carbon may be present in an amount of 0.1 parts by weight to 15 parts by weight, with respect to 100 parts by weight of the crystalline carbon.

In addition, the polyacrylic acid ester copolymer may be a copolymer of a (meth)acrylic acid ester-based monomer, and a monomer selected from the group consisting of an unsaturated carboxylic acid-based monomer, a vinyl-based monomer, a nitrile-based monomer and a mixture thereof.

In addition, the polyacrylic acid ester copolymer may be present in an amount of 0.1 to 10 parts by weight, with respect to 100 parts by weight of crystalline carbon.

In another aspect of the present invention, provided is a method of producing a negative electrode active material for secondary batteries including forming a first surface treatment layer including amorphous carbon or oxidized crystalline carbon on a surface of crystalline carbon, and forming a second surface treatment layer including a polyacrylic acid ester copolymer on the first surface treatment layer.

In the production method, the forming the first surface treatment layer may be carried out by mixing the polyhedral crystalline carbon with pitch, feeding the mixture into a furnace and baking the mixture at a temperature of 300° C. to 1400° C., or dipping the polyhedral crystalline carbon in an acid, or a mixed solution of an acid and an oxidizing agent.

In addition, the forming the second surface treatment layer may be carried by surface-treating the crystalline carbon provided with the first surface treatment layer with a solution containing a polyacrylic acid ester copolymer, or adding the crystalline carbon to a solution containing a monomer for forming the polyacrylic acid ester copolymer and then conducting polymerization on a surface of the crystalline carbon.

In another aspect of the present invention, provided is a negative electrode for secondary batteries including the negative electrode active material.

In another aspect of the present invention, provided is an electrode assembly including a positive electrode and a negative electrode alternately stacked via a separator interposed therebetween, wherein the negative electrode includes the negative electrode active material according to the present invention.

In yet another aspect of the present invention, provided is a secondary battery including the electrode assembly.

Effects of the Invention

According to the present invention, the negative electrode active material for secondary batteries according to the present invention has a polyhedral shape enabling surface-to-surface contact between active materials, thereby increasing movement of electrons and thus improving output characteristics of batteries. The negative electrode active material includes a double-layer structure of surface-treatment layer on the surface thereof, thereby inhibiting reaction with an electrolyte and improving high-temperature stability of batteries.

DESCRIPTION OF DRAWINGS

The above and other objects, features and other advantages of the present invention will be more clearly understood from the following detailed description taken in conjunction with the accompanying drawings, in which:

FIG. 1 is a schematic view illustrating a structure of polyhedral crystalline carbon in a negative electrode active material according to an embodiment of the present invention;

FIG. 2 is a graph showing output characteristics of batteries including negative electrode active materials produced in Example 1 and Comparative Example 1; and FIG. 3 is a graph showing high-temperature (60° C.) storage characteristics of batteries including negative electrode active materials produced in Example 1 and Comparative Example 1.

BEST MODE

Hereinafter, embodiments according to the present invention will be described in detail to such an extent that a person having ordinary knowledge in the art field to which the invention pertains can easily carry out the invention. However, the present invention can be realized in various forms and is not limited to embodiments stated herein.

The negative electrode active material for secondary batteries according to an embodiment of the present invention includes: polyhedral crystalline carbon; a first surface treatment layer which is disposed on the surface of the crystalline carbon and includes amorphous carbon or oxidized crystalline carbon; and a second surface treatment layer which is disposed on the first surface treatment layer and includes a polyacrylic acid ester copolymer.

With respect to the negative electrode active material, the crystalline carbon may include natural graphite, artificial graphite or the like. Of these, the crystalline carbon may be natural graphite in consideration of superior voltage flatness and high capacity similar to theoretical capacity and the crystalline carbon may be artificial graphite in consideration of high charge/discharge efficiency.

The crystalline carbon may become polyhedral depending on graphitization or grinding or coarse granulation of graphite particles. Specifically, when the core is artificial graphite, the crystalline carbon can become polyhedral by a method such as graphitization or a method such as grinding of particles and, when the core is natural graphite, the crystalline carbon can become polyhedral by grinding or coarse granulation.

FIG. 1 is a schematic view illustrating the structure of polyhedral crystalline carbon in a negative electrode active material according to an embodiment of the present invention. FIG. 1 is provided only for describing the present invention and the present invention is not limited thereto.

As shown in FIG. 1, when crystalline carbon 1 is polyhedral, particles of an active material can surface-to-surface contact one another. As a result, as compared to spherical graphite particles which allow movement of electrons by point-to-point contact, polyhedral crystalline carbon allows movement of more electrons, thus greatly improving output characteristics of batteries. In addition, polyhedral crystalline carbon can maintain conductivity even upon repeated charge/discharge, thus inhibiting an increase in direct current resistance (DCR).

Specifically, the crystalline carbon may be a polyhedron having 5 sides (pentahedron) to 20 sides (icosahedron), preferably, a polyhedron having 7 sides (heptahedron) to 15 sides (pentadecahydron). When the number of sides of the polygon is less than 5, an effect of improving output characteristics of batteries may be insufficient due to decreased number of contact sides and, when the number of sides of the polygon exceeds 20, the crystalline carbon has a sphere-like shape, an effect of improving output characteristics of batteries may be insufficient due to formation of spherical point-to-point contact.

In addition, the crystalline carbon may be polyhedral and may have a mean particle diameter ($D_{50}$, particle diameter based on particle diameter distribution of 50%) of particles of 5 μm to 20 μm and a specific surface area of 1 $m^2$/g to 10 $m^2$/g. When the mean particle diameter ($D_{50}$) is less than 1 μm, initial battery capacity may be deteriorated due to increased irreversible capacity and, when the mean particle diameter ($D_{50}$) exceeds 20 μm, binding ability between particles, and binding ability between particles and the current collector are deteriorated over repeated charge/discharge due to serious expansion and cycle characteristics of batteries may be thus degraded. In addition, when the specific surface area of the crystalline carbon is less than 0.1 $m^2$/g, lithium may be readily deposited on the electrode surface and, as a result, stability may be deteriorated and, when the specific surface area exceeds 100 m²/g, it may be difficult to control side reaction with an electrolyte due to wide specific surface area.

In addition, in the negative electrode active material, the first surface treatment layer including amorphous carbon or oxidized crystalline carbon is disposed on the surface of crystalline carbon. The amorphous carbon and oxidized crystalline carbon present in the first surface treatment layer functions to control reaction between crystalline carbon and an electrolyte.

Regarding the first surface treatment layer, amorphous carbon can be formed by coating liquid or solid pitch on crystalline carbon, but the present invention is not limited thereto. Specifically, the amorphous carbon can be formed by baking pitch and crystalline carbon in a furnace at a temperature of 300° C. to 1,400° C. In this case, the pitch may be coal pitch or petroleum pitch, but the present invention is not limited thereto.

In addition, the first surface treatment layer including amorphous carbon may be formed on the entire or partial surface of the crystalline carbon. Specifically, with respect to the negative electrode active material, the amorphous carbon may be present in an amount of 0.01 to 15 parts by weight, with respect to 100 parts by weight of crystalline carbon. When the amorphous carbon is present in an amount lower than of 0.01 parts by weight, hardness of carbon may be decreased and side reaction with an electrolyte may increase, and when the amorphous carbon is present in an amount exceeding 15 parts by weight, mobility of lithium ions is hindered and resistance is thus increased due to excessively increased thickness of the first surface treatment layer including amorphous carbon, and electrode density cannot be increased due to hardened surface of the first surface treatment layer.

With respect to the first surface treatment layer, the oxidized crystalline carbon can be formed by oxidation of crystalline carbon.

Specifically, the oxidized crystalline carbon can be formed by impregnating crystalline carbon with an acid such as sulfuric acid or nitric acid. The oxidation results in introduction of an oxygen functional group such as $SO_3^{2-}$, $NO_3^-$, a carboxyl group or a hydroxyl group, between layers of the crystal structure of crystalline carbon, thus causing phase shift to graphite oxide. At this time, in order to increase introduction of the oxygen functional group, an oxidizing agent such as hydrogen peroxide, potassium permanganate, chromic acid, potassium dichromate, periodic acid or perchloric acid may be optionally used, and thermal treatment may be further performed at 100 to 300° C.

In addition, the first surface treatment layer including oxidized crystalline carbon may be formed on the entire or partial surface of the crystalline carbon. Specifically, regarding the negative electrode active material, the oxidized crystalline carbon may be present in an amount of 0.1 to 15 parts by weight, with respect to 100 parts by weight of crystalline carbon. When the oxidized crystalline carbon is present in an amount less than 0.1 parts by weight, side reaction with an electrolyte may increase and, when the oxidized crystalline carbon is present in an amount exceeding 15 parts by weight, mobility of lithium ions is hindered and resistance is thus increased.

In addition, regarding the negative electrode, the second surface treatment layer to improve high-temperature stability of batteries is disposed on the first surface treatment layer.

Specifically, the second surface treatment layer includes a polyacrylic acid ester copolymer, thereby maintaining a stable surface and improving high-temperature stability of batteries.

The polyacrylic acid ester copolymer may be specifically a copolymer of a (meth)acrylic acid ester-based monomer and a monomer selected from the group consisting of an unsaturated carboxylic acid-based monomer, a vinyl-based monomer, a nitrile-based monomer and a mixture thereof.

The (meth)acrylic acid ester-based monomer may be specifically methyl acrylate, ethyl acrylate, propyl acrylate, isopropyl acrylate, n-butyl acrylate, isobutyl acrylate, n-amyl acrylate, isoamyl acrylate, n-ethyl hexyl acrylate, 2-ethyl hexyl acrylate, 2-hydroxy ethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethyl hexyl methacrylate, 2-ethyl hexyl methacrylate, hydroxyethyl methacrylate, hydroxypropyl methacrylate or the like. Of these, one or a mixture thereof may be used.

In addition, the unsaturated carboxylic acid-based monomer may be maleic acid, fumaric acid, methacrylic acid, acrylic acid, glutaconic acid, itaconic acid, tetrahydrophthalic acid, crotonic acid, isocrotonic acid or nadic acid. Of these, one or a mixture thereof may be used.

In addition, the vinyl-based monomer may be styrene, α-methyl styrene, β-methyl styrene, p-t-butyl styrene, divinyl benzene or the like. Of these, one or a mixture thereof may be used.

In addition, the nitrile-based monomer may be succinonitrile, sebaconitrile, fluoronitrile, chloronitrile, acrylonitrile, methacrylonitrile or the like. Of these, one or a mixture thereof may be used.

In addition, the second surface treatment layer may be formed on the entire or partial surface of crystalline carbon provided with the first surface treatment layer. Specifically, regarding the second surface treatment layer of the negative electrode active material, the polyacrylic acid ester copolymer may be present in an amount of 0.1 to 10 parts by weight, with respect to 100 parts by weight of crystalline carbon. When the polyacrylic acid ester copolymer is present in an amount less than 0.1 parts by weight, an effect of improving high-temperature stability is insufficient and, when the polyacrylic acid ester copolymer is present in an amount exceeding 10 parts by weight, mobility of lithium ions may be hindered and resistance may be thus increased.

The negative electrode active material having a structure as described above may be produced by a method including forming a first surface treatment layer including non-crystalline carbon or oxidized crystalline carbon on polyhedral crystalline carbon and forming a second surface treatment layer including a polyacrylic acid ester copolymer on the first surface treatment layer. In accordance with another embodiment of the present invention, a method of producing the negative electrode active material is provided.

Regarding the production method, polyhedral crystalline carbon, non-crystalline carbon and oxidized crystalline carbon are the same as described above.

In addition, regarding the production method, the formation of the first surface treatment layer may be carried out by mixing polyhedral crystalline carbon with pitch, feeding the mixture into a furnace and baking the same at a temperature of 300° C. to 1,400° C., or by dipping crystalline carbon in an acid such as sulfuric acid or nitric acid, or a mixed solution of an acid and an oxidizing agent. The pitch, acid and oxidizing agent are the same as described above, except that the oxidizing agent is used in an amount of 30 parts by weight or less, specifically 20 to 30 parts by weight, with respect to 100 parts by weight of the acid. In addition, during or after dipping crystalline carbon in the acid or the solution of an acid and an oxidizing agent, heating may be optionally conducted at 100 to 300° C.

Next, regarding the production method, the second surface treatment layer may be formed by surface-treating the crystalline carbon provided with the first surface treatment layer in the step described above with a solution containing a polyacrylic acid ester copolymer by an ordinary method such as application, impregnation or spraying, or adding the crystalline carbon to a solution containing a monomer for forming the polyacrylic acid ester copolymer and conducting polymerization on the surface of crystalline carbon. The monomer for forming the polyacrylic acid ester copolymer includes: a (meth)acrylic acid ester-based monomer; and a monomer selected from the group consisting of an unsaturated carboxylic acid-based monomer, a vinyl-based monomer, a nitrile-based monomer and a mixture thereof. In addition, the solution containing the monomer for forming the polyacrylic acid ester copolymer may further include a polymerization initiator for polymerization.

The negative electrode active material produced by the production method described above has a polyhedral shape enabling surface-to-surface contact between active materials, thereby increasing movement of electrons and thus improving output characteristics of batteries. The negative electrode active material includes double surface-treatment layers on the surface thereof, thereby inhibiting reaction with an electrolyte and improving high-temperature stability of batteries.

Accordingly, in accordance with another embodiment of the present invention, a negative electrode including the negative electrode active material is provided.

Specifically, the negative electrode includes a current collector and a negative electrode active material layer disposed on at least one surface of the current collector wherein the negative electrode active material layer includes the negative electrode active material described above.

The negative electrode can be produced by a method well-known in the art except that the negative electrode active material described above is used. Specifically, the negative electrode may be formed by applying, drying and rolling the negative electrode active material slurry including a negative electrode active material on at least one surface of the current collector.

Regarding the negative electrode, the current collector means a negative electrode current collector, may be selected from current collectors well-known in the art without limitation and is for example copper, nickel or the like.

In addition, regarding the negative electrode, the negative electrode active material layer may further include, in addition to the negative electrode active material, at least one of a conductive material to improve conductivity and a filler to prevent expansion of the negative electrode.

In this case, the conductive material is used without particular limitation so long as it is conductive while not causing chemical changes in the produced battery. For example, the conductive material may be carbon black, such as Denka black, acetylene black, Ketjen black, furnace black, or thermal black, natural graphite, artificial graphite or the like. In particular, carbon black, graphite powder or carbon fiber is preferred.

In addition, the filler is used without particular limitation so long as it is a fibrous material while not causing chemical changes in the produced battery. Examples of the filler include olefin polymers such as polyethylene and polypropylene and fibrous materials such as glass fibers and carbon fibers.

In accordance with another embodiment of the present invention, an electrode assembly including the negative electrode is provided.

Specifically, the electrode assembly has a structure in which a positive electrode and a negative electrode are alternately stacked such that a separator is interposed between the positive and negative electrodes. In this case, the negative electrode is the negative electrode for secondary batteries according to the present invention.

Regarding the electrode assembly, the positive electrode can be produced by a method well-known in the art and is for example produced by applying a positive electrode active material onto a positive electrode current collector, followed by drying. The positive electrode current collector may be aluminum or the like and the positive electrode active material may be a lithium-containing transition metal oxide, but the present invention is not limited thereto.

Next, the separator is interposed between the positive electrode and the negative electrode, and functions to insulate the positive and negative electrodes from each other. Generally, the separator is an insulating thin film having high ion permeability and mechanical strength. In this case, the separator, for example, has a pore diameter of 0.01 µm to 10 µm and a thickness of 5 µm to 310 µm.

In addition, the separator may be used without limitation so long as it is generally used in the art and is, for example, a chemical-resistant and hydrophobic olefin (such as polypropylene) polymer glass fiber, or a sheet or non-woven fabric or craft paper made of polyethylene or the like. More specifically, the separator may be selected from the group consisting of high-density polyethylene, low-density polyethylene, linear low-density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene and a mixture thereof, but the present invention is not limited thereto.

Meanwhile, in the present invention, the electrode assembly has a structure in which at least one positive electrode and at least one negative electrode are alternately stacked such that a separator is interposed between the positive and negative electrodes and may have a stacked or stacked/folded structure, but may be used without particular limitation.

MODE FOR INVENTION

Hereinafter, preferred examples will be provided for better understanding of the present invention. The following examples are only given for better understanding of the present invention and should not be construed as limiting the scope of the present invention.

Preparation Example: Preparation of Negative Electrode Active Material

Preparation Example 1

Artificial graphite was ground to have a polyhedral shape. The artificial graphite thus obtained was a decahedron having a mean particle diameter ($D_{50}$) of 16 µm and a specific surface area of 2.7 m$^2$/g. 100 g of the resulting polyhedral artificial graphite was mixed with 5 g of pitch and the mixture was baked in a furnace at a temperature of 800° C. to form a pitch coating layer on the surface of artificial graphite. The content of pitch in the pitch coating layer was 3 parts by weight, with respect to 100 parts by weight of artificial graphite.

Next, artificial graphite provided with the pitch coating layer was mixed with methyl acrylate, styrene, a methacrylic acid copolymer and azobisisobutyronitrile to prepare a mixture. The mixture was added to an aqueous dispersion prepared by adding 510 ml of a 0.1M sodium phosphate solution and 75 ml of a 1M calcium chloride solution to 1 L of distilled water, homogenized with a homogenizer and then reacted at 70° C. for one day while stirring. After the reaction, the pH of a reactor was adjusted to 1, the reaction product was filtered and washed with distilled water and dried in a vacuum oven to obtain a negative electrode active material including a first surface treatment layer of pitch and a second surface treatment layer of a polyacrylic acid ester copolymer sequentially formed on the surface of polyhedral artificial graphite.

Preparation Example 2

1 g of artificial graphite was impregnated in sulfuric acid ($H_2SO_4$, 98%) at 25° C., hydrogen peroxide ($H_2O_2$, 35%) was added thereto and the artificial graphite was impregnated in a solution consisting of sulfuric acid and hydrogen peroxide for 24 hours. The resulting artificial graphite powder was isolated, washed with distilled water three times and thoroughly dried at 80° C. for 24 hours to prepare an oxidized artificial graphite powder.

A negative electrode active material was produced in the same manner as in Preparation Example 1, except that oxidized artificial graphite was used instead of the artificial graphite provided with the pitch coating layer.

Example: Production of Lithium Secondary Battery

Examples 1 and 2

A negative electrode active material slurry was prepared by mixing each of negative electrode active materials produced in Preparation Examples 1 and 2 and the negative electrode active material with SBR and CMC at a weight ratio of 98:1:1. The prepared negative electrode active material slurry was coated to a thickness of 65 μm on a surface of a copper current collector, dried, rolled and punched to a desired size to produce a negative electrode.

Ethylene carbonate (EC) and diethyl carbonate (DEC) were mixed at a volume ratio of 30:70 and $LiPF_6$ was added to the non-aqueous electrolyte solvent to prepare a 1M $LiPF_6$ non-aqueous electrolyte.

In addition, a lithium metal foil was used as a reference electrode, that is, positive electrode, a polyolefin separator was interposed between the positive and negative electrodes, and the electrolyte was inserted to produce a coin-type lithium secondary battery.

Comparative Example 1

A lithium secondary battery was produced in the same manner as in Example 1, except that the polyhedral artificial graphite provided with the pitch coating layer produced in Preparation Example 1 was used as a negative electrode active material.

Comparative Example 2

A lithium secondary battery was produced in the same manner as in Example 1, except that spherical artificial graphite (having a mean particle diameter ($D_{50}$) of 16 μm and a specific surface area of 2.7 $m^2/g$) was used instead of the polyhedral artificial graphite used in Preparation Example 1.

Test Example 1: Evaluation of Output Characteristics

Lithium secondary batteries of Example 1 and Comparative Example 1 were discharged at room temperature (25° C.) and at 5 C in each SOC (state of charge) for 10 seconds. A resistance was calculated from the resulting voltage difference. Results are shown in FIG. 2.

Referring to FIG. 2, at SOC of 90%, the lithium secondary battery of Example 1 had lower resistance than that of the lithium secondary battery of Comparative Example 1. Similarly, even when SOCs were 80%, 70%, 60%, 50%, 40%, 30%, 20% and 10%, the same results as the case in which SOC was 90% were obtained. It can be seen from the results that the lithium secondary battery of Example 1 had improved output characteristics as compared to Comparative Example 1.

Test Example 2: Evaluation of High-temperature Storage Characteristics

Lithium secondary batteries of Example 1 and Comparative Example 1 were stored at 60° C. in a chamber for one week, charged at 1 C to 4.2V/3 mA under the CC/CV condition and discharged at 1 C to 2.5V under the CC condition and discharge capacity was measured. Results are shown in FIG. 3.

Referring to FIG. 3, the lithium secondary battery of Example 1 according to the present invention exhibited a broad gradient of capacity retention for a storage period of one week, as compared to the lithium secondary battery of Comparative Example 1, whereas the lithium secondary battery of Comparative Example 1 exhibited a sharp decrease in capacity retention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE NUMERAL

1: Polyhedral crystalline carbon

INDUSTRIAL APPLICABILITY

The present invention is directed to a negative electrode active material for secondary batteries, and a negative electrode, an electrode assembly and a secondary battery including the same. The negative electrode active material includes polyhedral crystalline carbon, a first surface treatment layer disposed on a surface of the crystalline carbon and a second surface treatment layer disposed on a surface of the first surface treatment layer, thereby improving output characteristics of batteries based on increased mobility of electrons resulting from surface-to-surface contact between active materials, controlling reactivity with an electrolyte and enhancing high-temperature storage performance of batteries.

The invention claimed is:

1. A negative electrode active material for secondary batteries comprising:
   polyhedral crystalline carbon having 5 sides to 20 sides;
   a first surface treatment layer disposed on a surface of the polyhedral crystalline carbon and
   a second surface treatment layer disposed on an entire surface of the first surface treatment layer,
   wherein the first surface treatment layer comprises amorphous carbon or oxidized crystalline carbon, and
   the second surface treatment layer comprises a polyacrylic acid ester copolymer
   wherein the polyacrylic acid ester copolymer is present in an amount of 0.1 to 10 parts by weight with respect to 100 parts by weight of the polyhedral crystalline carbon.

2. The negative electrode active material for secondary batteries according to claim 1, wherein the polyhedral crystalline carbon comprises any one selected from the group consisting of natural graphite, artificial graphite and a mixture thereof.

3. The negative electrode active material for secondary batteries according to claim 1, wherein a coating layer of the amorphous carbon comprises liquid or solid pitch.

4. The negative electrode active material for secondary batteries according to claim 1, wherein the amorphous carbon is present in an amount of 0.01 parts by weight to 15 parts by weight, with respect to 100 parts by weight of the polyhedral crystalline carbon.

5. The negative electrode active material for secondary batteries according to claim 1, wherein the oxidized crystalline carbon comprises an oxygen functional group introduced between layers of a crystal structure of a crystalline carbon.

6. The negative electrode active material for secondary batteries according to claim 5, wherein the oxygen functional group comprises any one selected from the group consisting of $SO_3^{2-}$, $NO_3^-$, a carboxyl group, a hydroxyl group and a combination thereof.

7. The negative electrode active material for secondary batteries according to claim 1, wherein the oxidized crystalline carbon is present in an amount of 0.1 parts by weight to 15 parts by weight, with respect to 100 parts by weight of the polyhedral crystalline carbon.

8. The negative electrode active material for secondary batteries according to claim 1, wherein the polyacrylic acid ester copolymer is a copolymer of a (meth)acrylic acid ester-based monomer, and a monomer selected from the group consisting of an unsaturated carboxylic acid-based monomer, a vinyl-based monomer, a nitrile-based monomer and a mixture thereof.

9. A method of producing the negative electrode active material according to claim 1 for secondary batteries comprising:
   forming a first surface treatment layer comprising amorphous carbon or oxidized crystalline carbon on a surface of a polyhedral crystalline carbon; and
   forming a second surface treatment layer comprising a polyacrylic acid ester copolymer on the first surface treatment layer.

10. The method according to claim 9, wherein the forming the first surface treatment layer is carried out by mixing the polyhedral crystalline carbon with pitch, feeding the mixture into a furnace and baking the mixture at a temperature of 300° C. to 1400° C., or dipping the polyhedral crystalline carbon in an acid, or a mixed solution of an acid and an oxidizing agent.

11. The method according to claim 9, wherein the forming the second surface treatment layer is carried by surface-treating the polyhedral crystalline carbon provided with the first surface treatment layer with a solution containing a polyacrylic acid ester copolymer, or adding the polyhedral crystalline carbon to a solution containing a monomer for forming the polyacrylic acid ester copolymer and then conducting polymerization on a surface of the polyhedral crystalline carbon.

12. A negative electrode for secondary batteries comprising:
   a current collector; and
   a negative electrode active material slurry disposed on at least one surface of the current collector,
   wherein the negative electrode active material slurry comprises the negative electrode active material according to claim 1.

13. An electrode assembly comprising a positive electrode and a negative electrode alternately stacked via a separator interposed therebetween,
   wherein the negative electrode comprises the negative electrode for secondary batteries according to claim 12.

14. A secondary battery comprising the electrode assembly according to claim 13.

* * * * *